United States Patent
Bolinth et al.

(10) Patent No.: US 7,065,353 B1
(45) Date of Patent: Jun. 20, 2006

(54) METHOD FOR CONTROLLING THE HANDOVER OF TELECOMMUNICATION CONNECTIONS BETWEEN MOBILE PARTS AND BASE STATIONS IN CELLULAR TELECOMMUNICATIONS SYSTEMS HAVING WIRELESS TELECOMMUNICATION

(75) Inventors: Edgar Bolinth, Mönchengladbach (DE); Uwe Schwark, Bocholt (DE); Michael Färber, Wolfratshausen (DE); Armin Sitte, Berlin (DE); Thomas Ulrich, Berlin (DE); Anja Klein, Berlin (DE); Meik Kottkamp, Berlin (DE); Erich Kamperschroer, Hamminkeln (DE); Michael Benz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/720,444

(22) PCT Filed: Jun. 23, 1999

(86) PCT No.: PCT/DE99/01830

§ 371 (c)(1),
(2), (4) Date: Feb. 23, 2001

(87) PCT Pub. No.: WO99/67967

PCT Pub. Date: Dec. 29, 1999

(30) Foreign Application Priority Data

Jun. 23, 1998 (DE) .................................. 198 27 919

(51) Int. Cl.
*H04Q 7/30* (2006.01)
(52) U.S. Cl. .................... 455/426.1; 455/437; 455/462

(58) Field of Classification Search ................ 455/444, 455/443, 437, 436, 438, 417, 426, 426.1, 455/439, 462
See application file for complete search history.

(56) References Cited

U.S. PATENT DOCUMENTS 5,499,386 A    3/1996  Karlsson (Continued)

FOREIGN PATENT DOCUMENTS

EP    0 888 026    12/1998

(Continued)

OTHER PUBLICATIONS

ETSI—Publication, Oct. 1992, ETS 300175 1 . . . 9, Part 1: Overview, pp. 1-30; Part 2: Physical layer, pp. 1-39; Part 3: Medium access control layer, pp. 1-197; Part 4: Data link control layer, pp. 1-128; Part 5: Network layer, pp. 1-241; Part 6: Identities and addressing, pp. 1-41; Part 7: Security features, pp. 1-104; Part 8: Speech coding and transmission, pp. 1-39; Part 9: Public access profile, pp. 1-71.

(Continued)

*Primary Examiner*—Edward F. Urban
*Assistant Examiner*—Blane J. Jackson
(74) *Attorney, Agent, or Firm*—Bell, Boyd & Lloyd LLC

(57) ABSTRACT

In a cellular telecommunications system using wireless telecommunication between mobile parts and base stations, a method of handing off telecommunications connections from uncoordinated, unlicensed operation of the system to coordinated, licensed operation and vice versa. The method requires only simple circuitry and little energy consumption in the mobile parts. Initial monitoring is carried out in the base station, which supports uncoordinated, unlicensed system operation.

6 Claims, 5 Drawing Sheets

U.S. PATENT DOCUMENTS

| | | | |
|---|---|---|---|
| 5,640,677 A | | 6/1997 | Karlsson |
| 5,724,665 A | * | 3/1998 | Abbasi et al. ............... 455/561 |
| 5,854,981 A | | 12/1998 | Wallstedt et al. |
| 5,873,033 A | * | 2/1999 | Hjern et al. ................. 455/417 |
| 5,913,166 A | * | 6/1999 | Buttitta et al. .............. 455/436 |
| 5,920,818 A | | 7/1999 | Frodigh et al. |
| 5,995,839 A | * | 11/1999 | Coursey et al. ............. 455/445 |
| 6,073,015 A | * | 6/2000 | Berggren et al. ........ 455/432.2 |
| 6,278,883 B1 | * | 8/2001 | Choi ....................... 455/552.1 |
| 6,314,082 B1 | * | 11/2001 | Malmgren ................. 370/208 |
| 6,421,368 B1 | * | 7/2002 | Vanderpool ................ 375/130 |

FOREIGN PATENT DOCUMENTS

| | | |
|---|---|---|
| WO | WO 96/10305 | 4/1996 |
| WO | WO 97/32445 | 9/1997 |
| WO | WO 98/25431 | 6/1998 |

OTHER PUBLICATIONS

Dect—Publikation des DECT—Forums, Feb. 1997, pp. 1-16.

IEICE Transactions on Fundamentals of Electronics, Communications and Computer Sciences, vol. E79-A., No. 12, Dec. 1996, pp. 1930-1937; P W Baier et al., "CDMA Myths and Realities Revisited".

IEEE Personal Communications, Feb. 1995, pp. 38-47; A. Urie et al., "An Advanced TDMA Mobile Access System for UMTS".

IEEE Personal Communications, Feb. 1995, pp. 48-53, P G Andermo et al., "An CDMA Based Radio Access Design for UMTS".

IEEE Communications Magazine, Jan. 1995, pp. 50-57, Falconer et al, Time Division Multiple Access Methods for Wireless Personal Communications.

* cited by examiner

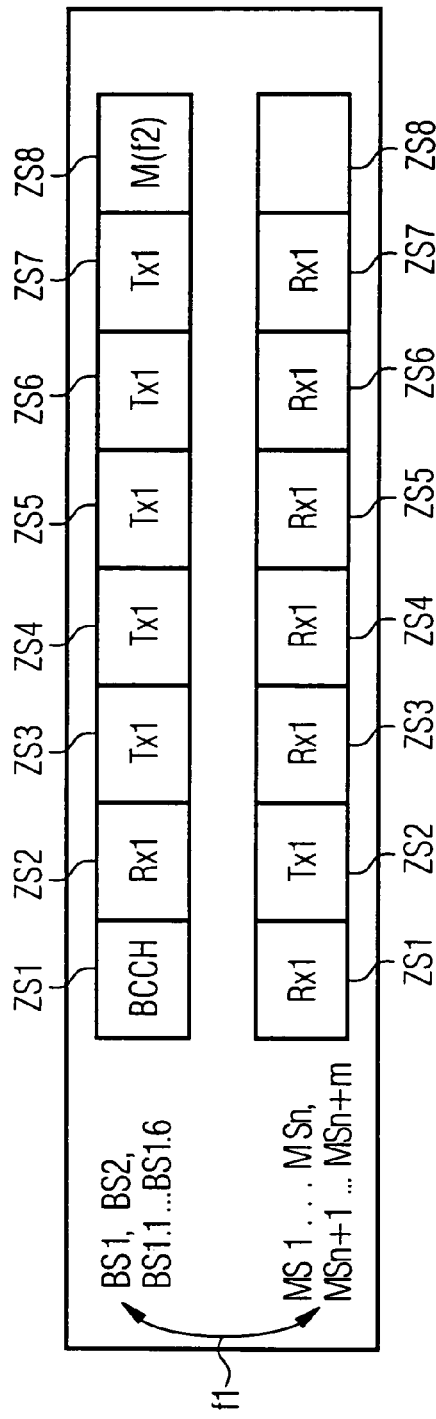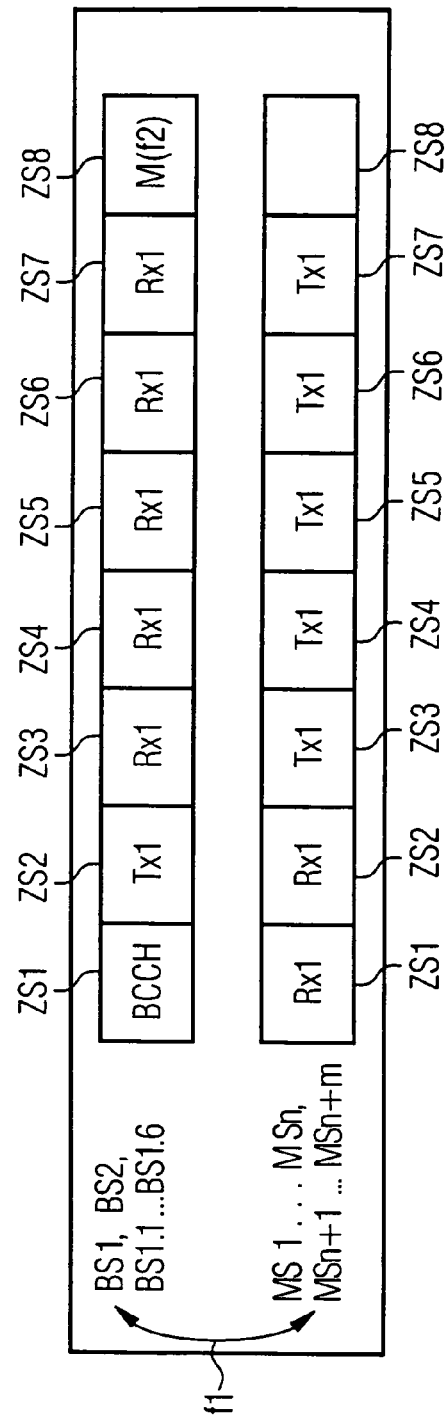
FIG 5
FIG 6

METHOD FOR CONTROLLING THE HANDOVER OF TELECOMMUNICATION CONNECTIONS BETWEEN MOBILE PARTS AND BASE STATIONS IN CELLULAR TELECOMMUNICATIONS SYSTEMS HAVING WIRELESS TELECOMMUNICATION

BACKGROUND OF THE INVENTION

1. Field of the Invention

In general, the present invention pertains to the field of wireless telecommunications. In particular, the present invention pertains to wireless telecommunication system handover controls.

2. Discussion of the Related Art

Telecommunications systems using wireless telecommunication between mobile and/or stationary transmitting/receiving appliances are specific message systems with a message transmission path between a message source and a message sink. In these systems, base stations and mobile parts are used as transmitting and receiving appliances for processing and transmitting messages in which the message processing and message transmission can be carried out in a preferred transmission direction (simplex operation) or in both transmission directions (duplex operation), the message processing is preferably digital and messages are transmitted via a long-distance transmission path without using wires.

The message processing and transmission is based on various message transmission methods to allow for multiple use of message transmission pats, such as FDMA (Frequency Division Multiple Access), TDMA (Time Division Multiple Access) or CDMA (Code Division Multiple Access). For instance, in accordance with standards such as DECT Digital Enhanced Cordless Telecommunication, as discussed in Nachrichtentechnik Elektronik [Information Technology, Electronics] 42 (1992) January/February, No. 1, Berlin, Germany, or in U. Pilger "Struktur des DECT-Standards" [Structure of the DECT Standard], pages 23 to 29 in conjunction with ETSI Publication ETS 3001750-1 Oct. 9, 1992 and the DECT Publication from the DECT Forum, February 1997, pages 1 to 16], GSM [Groupe Special Mobile or Global System for Mobile Communication. See also, Informatik Spektrum [Information Technology Spectrum] 14 (1991) June, No. 3, Berlin, Del.; A. Mann: "Der GSM-Standard—Grundlage für digitale europäische Mobilfunknetze", [The GSM Standard—Basis for Digital European Mobile Radio Networks, pages 137 to 152 in conjunction with the publication Telekom Praxis, April 1993, P. Smolka "GSM-Funkschnittstelie-Element und Funktionen", [GSM radio interface—Elements and functions], pages 17 to 24, UMTS [Universal Mobile Telecommunication System. Further discussion is provided by Nachrichtentechnik Eiektronik, [Information Technology Electronics], Berlin 45, 1995, Issue 1, pages 10 to 14 and Issue 2, pages 24 to 27, and by P. Jung, B. Steiner: "Konzept eines CDMA-Mobiifunk-systems mit gemeinsamer Detektion Für Die Dritte Mobiifunk-generation" [Concept of a CDMA Mobile Radio System with Joint Detection for Third Generation Mobile Radio], and by Nachrichtentechnik Eiektronik, [Information Technology, Electronics], Berlin 41, 1991, Issue 6, pages 223 to 227 and page 234; P. W. Baier, P. Jung, A. Klein: "CDMA-ein günstiges Vieifachzugriffs-verfahren für frequenzselek tive und zeitvariante Mobil-funkkanäle"; [CDMA-A Useful Multiple Access Method For Frequency-Selective and Time-Variant Mobile Radio Channels]. Further discussion is given in IEICE Transactions on Fundamentals of Electronics, Communications and Computer Sciences, Vol. E79-A, No. 12, December 1996, pages 1930 to 1937, and P. W. Baier, P. Jung: "CDMA Myths and Realities Revisited", and IEEE Personal Communications, February 1995, pages 38 to 47. Aslo see, A. Urie, M. Streeton, C. Mourot: "An Advanced TDMA Mobile Access System for UMTS", Telekom Praxis, 5/1995, pages 9 to 14; P. W. Baier: "Spread-Spectrum Technik und CDMA-eine ursprünglich militärische Technik erobert den zivilen Bereich" [Spread Spectrum Technology and CDMA-An Originally Military Technology Wins Over the Civil Area], and in IEEE Personal Communications, February 1995, pages 48 to 53, in P. G. Andermo, L. M. Ewe rbring: "An CDMA-Based Radio Access Design for UMTS", in ITO Fachberichte [Specialist Report] 124 (1993), Berlin, Offenbach: VDE Verlag ISBN 3-8007-1965-7, pages 67 to 75, and in Dr. T. Zimmermann, Siemens AG: "Anwendung von CDMA in der Mobilkommunikation" [Use of CDMA in Mobile Communication]. Also see, Telecom Report 16, (1993), Issue 1, pages 38 to 41, a paper by Dr T. Ketseoglou, Siemens AG and Dr. T. Zimmermann, Siemens AG: "Effizienter Teilnehmerzugriff für die 3rd Generation der Mobilkommunikation-Vielfachzugriffsverfahren CDMA macht Luftschnittstelle flexibler"; [Efficient Subscriber Access for 3rd Generation Mobile Communication—The CDMA Multiple Access Method Makes the Air Interface More Flexible], and Funkschau 6/98: R. Sietmann "Ringen um die UMTSSchnittstelle" [Ringing Round the UMTS Interface], pages 76 to 81] WACS or PACS, IS-54, IS-95, PHS, PDC etc., as well as IEEE Communications Magazine, January 1995, pages 50 to 57, and D. D. Falconer et al: "Time Division Multiple Access Methods for Wireless Personal Communications."

The word message is a generic term which covers not only the information content but also the physical representation of its signal. Despite a message having the same information content, different signal forms may occur. Thus, a message relating to one item can be transmitted in the form of an image, as spoken word, as written word, or as an encrypted word or image.

Transmission types are normally characterized as continuous (analog) signals, while discontinuous signals, although pulses, digital signals may also be used.

In telecommunications systems of the type mentioned above, the handover of an ongoing call or connection is a highly time-critical process, since the continuity of ongoing connections must be ensured. In particular, a distinction is often required between an intracell handover, an intercell handover and an external handover.

In order to carry out a handover between a mobile transmitting/receiving appliance, such as a mobile station or a mobile part connected to a stationary transmitting/receiving appliance, and a base station or a fixed part in a cell, cell-specific information about the adjacent cell, or about a number of adjacent cells is required. The method used to receive this information is referred to as monitoring, wherein the mobile station monitors a control channel, the so-called Broadcast Control CHannel (BCCH) on which the cell-specific information is broadcast by the base station.

One problem with this method relates to how the mobile station obtains the required cell-specific information and the current parameters, such as, frequency, timeslot, and the code of the adjacent base station to which the connection is intended to be transferred by the handover procedure and to which the handover is then intended to be made, when the mobile station is in an uncoordinated, unlicensed scenario. Such a scenerio involves an arrangement where there are a large number of unsynchronized residential base stations, or in a purely coordinated, licensed cellular scenario, say in the case of a TDD-UMTS system, the scenario involves virtually all the physical channels occupied by data traffic which makes it almost impossible to receive the Broadcast Control CHannel of the adjacent base stations due to high data rates encountered.

SUMMARY OF THE INVENTION

It is an object of the present invention to provide a method for telecommunications connections to be handed off from uncoordinated, unlicenced operation to coordinated, licensed operation.

It is another object of the invention to provide a method for initial monitoring in a base station supporting uncoordinated, unlicensed system operation.

It is an additional object of the invention to provide a method to carry-out a time-critical handover from indoor to outdoor.

It is a further object of the invention to provide a method for initial monitoring where high asymmetric data rates are used.

These and other objects of the invention will become apparent upon careful review of the following disclosure, which is to be read in conjunction with review of the accompanying drawing figure.

BRIEF DESCRIPTION OF THE DRAWINGS

FIG. 5 shows another mobile station according to the present invention.

FIG. 6 shows another mobile station according to an exemplary embodiment.

DETAILED DESCRIPTION OF THE PREFERRED EMBODIMENT

Figure 1:
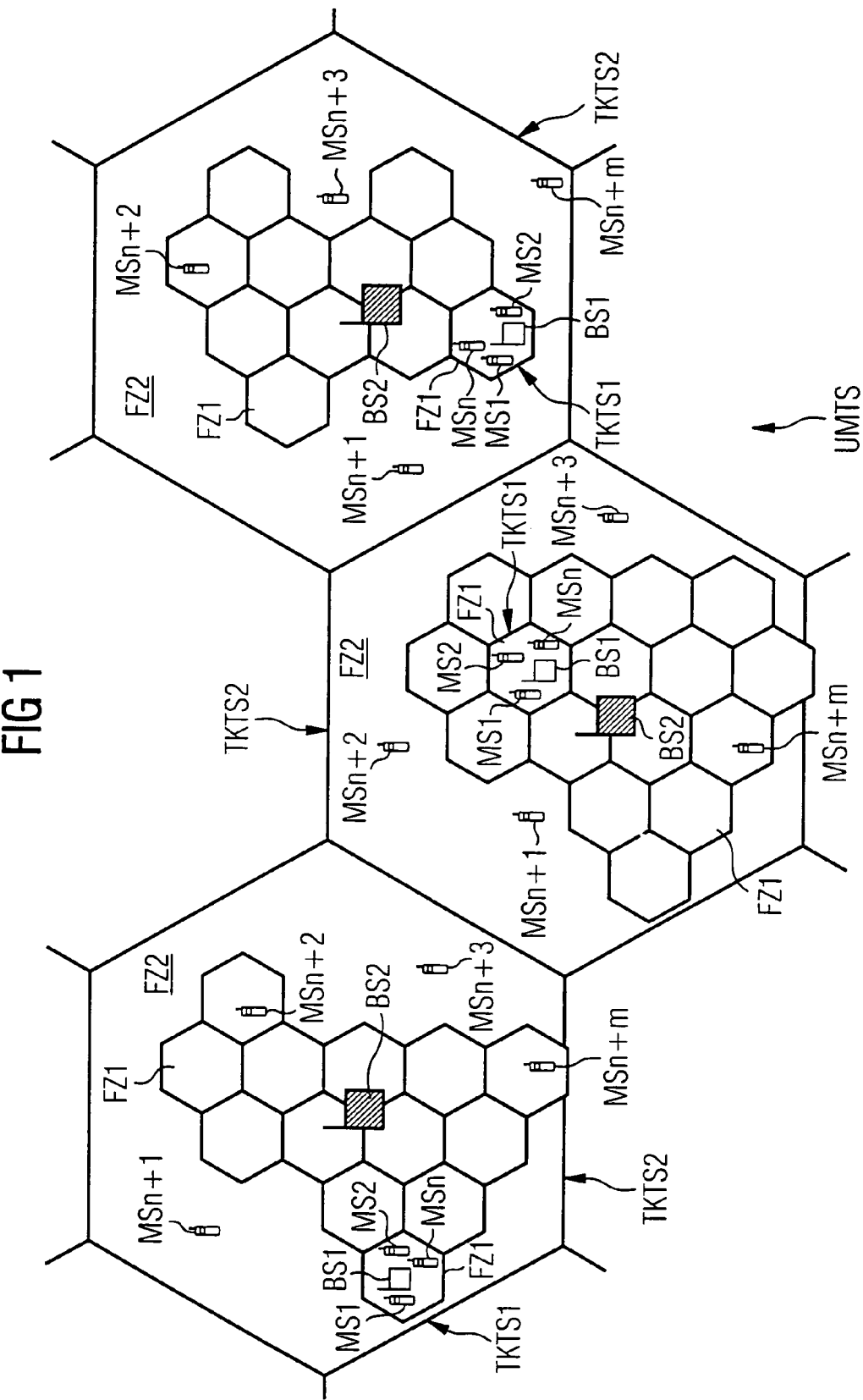
FIG. 1 shows a universal mobile telecommunications network.

FIG. 1 shows one possible UMTS scenario (Universal Mobile Telecommunication System) with a multicell universal mobile telecommunications system. UMTS operates using both the uncoordinated, unlicensed system mode and the coordinated, licensed system mode.

The UMTS system shown in FIG. 1 has a first telecommunications subsystem TKTSI which operates in first radio cells FZI using wireless telecommunication between a first base station BS1, in the form of an indoor base station, and n mobile stations, MS1 . . . Msn. The mobile stations, MS1 . . . MSn are preferably in the form of indoor/outdoor mobile stations, and are operated in the uncoordinated, unlicensed system mode. The UMTS system has a second telecommunications subsystem TKST2, which operates in second radio cells FZ2, using wireless telecommunication between a second base station BS2, which is also in the form of an outdoor base station, and m second mobile stations Msn+1 . . . Msn+m. The base stations, Msn+1 . . . Msn+m, are preferably in the form of indoor/outdoor mobile stations, and are operated in the coordinated, licensed system mode.

A mobile assisted handover is carried out in the known GSM scenario. Monitoring is carried out by the mobile station during the free timeslots. That is to say, when the mobile station autonomously receives the BCCH of the adjacent base stations. The mobile station selects that base station whose reception quality is the best, and signals this to its own base station. The handover in this case is initiated by the mobile station and is controlled by the base station. This is referred to as a mobile assisted handover. A critical factor in this case is for the mobile station to have already received advance information from the network operator, and on its active BCCH on the frequencies to be searched in the adjacent base stations.

In contrast to the GSM scenario, a mobile initiated and mobile controlled handover is carried out according to the DECT scenario. Monitoring is in this case carried out by the mobile station, and the handover is likewise controlled by the mobile station. The mobile station in this case has no advance information about which channels, i.e. which frequencies/timeslots—must be looked for during monitoring for the Broadcast Control CHannels of the adjacent cells. The BCCH, according to the DECT terminology, correspond to the channels in which dummy bearer information is transmitted.

A mobile assisted handover is likewise planned, as for the GMS scenario, for the cellular UMTS scenario, which is currently subject to standardization. The monitoring is carried out by the mobile part, and the handover is initiated by the mobile station and is controlled by the base station. It is highly probable that advance information from the network operator will also be required in this case about which channels [lacuna] (these are essentially the codes, since the frequency reuse is unity).

In all the scenarios mentioned above, the monitoring is carried out by means of the mobile station.

The problem of initial monitoring, such as information about channels on which the Broadcast Control Channel of the adjacent cells can be received, has until now been solved in the cellular field by means of advance information provided in advance by the network operator and intended for the respective mobile station, with this advance information having been transmitted to the relevant mobile station by the active base station using the Broadcast Control CHannel. The only exception is the DECT scenario, since, in this case, there is no need for initial monitoring for the coordinated, licensed mode. It is thus necessary during cellular DECT operation for the mobile station to continuously scan adjacent frequencies looking for the Broadcast Control CHannel for an intercell handover. However, with respect to standby times, this is not an optimum solution with respect to asymmetric data services and allocation of a number of timeslots. In uncoordinated DECT operation, only an intracell handover is possible, so that there is no need for initial monitoring.

In the past, no handover has existed from uncoordinated, unlicensed system operation to coordinated, licensed system operation such as residential TDD-UMTS system to the public FDD-UMTS or public TDD-UMTS system.

The idea on which the invention is based is to carry out the initial monitoring problem, mentioned initially, in the first base station which supports uncoordinated, unlicensed system operation.

This method offers the advantage that the BCCH search by the first base station, which supports uncoordinated, unlicensed system operation and has no a priori knowledge about the conditions in the adjacent cells, need be carried out only once by base stations arranged in the adjacent cells, when the appliance is switched on, and then may be carried out once again only at relatively long periodic intervals. This information is then signaled, such as using the BCCH to the mobile part or to the mobile station.

Fundamentally, the advantages for the mobile station are reduced power consumption, an increase in the standby time, the fact that the initial monitoring is carried out by the first base station, and reduced complexity in the case of pure residential mobile stations or indoor terminals. In addition, the complexity is integrated in the first base station.

Since the first base station receives cell specific information about the adjacent public cells only as a result of the initial monitoring (and, particularly for UMTS, a highly time-consuming computation process is required in order to detect a cell-specific scrambling code without advance information) a dual mode mobile station designed for indoor/outdoor purposes is for the first time able to carry out a particularly time-critical handover from indoor to outdoor.

The essential idea is for the monitoring to be carried out in the outdoor and indoor base station. Where high asymmetric data rates are used with TDD mode operation, this procedure offers advantages both for indoor to outdoor handover and for the intracell handover. Monitoring in the first base station can be used to provide an asymmetric service with a high downlink data rate and a low uplink data rate, and vice versa.

Monitoring in the first base station can also be used to provide interference measurement on another carrier frequency and, if required, to hand over the entire asymmetric connection to the other carrier frequency. This is known as interfrequency handover. An indoor to outdoor handover while maintaining the high data rate is likewise possible.

If the monitoring functionality is integrated in the base station and in the mobile station, then an asymmetric service with a low downlink data rate and a high uplink data rate can be handed over from one carrier frequency to a carrier. In this situation, the monitoring cannot be carried out by the base station since virtually all the timeslots are used for reception in this case, and the monitoring is in this case carried out by the mobile station.

An exemplary embodiment of the invention will be explained with reference to FIGS. 2 to 7.

Based on the UMTS scenario, shown in FIG. 1, the telecommunication system will operate both in the uncoordinated, unlicensed system mode and in the coordinated, licensed system mode.

Figure 2:
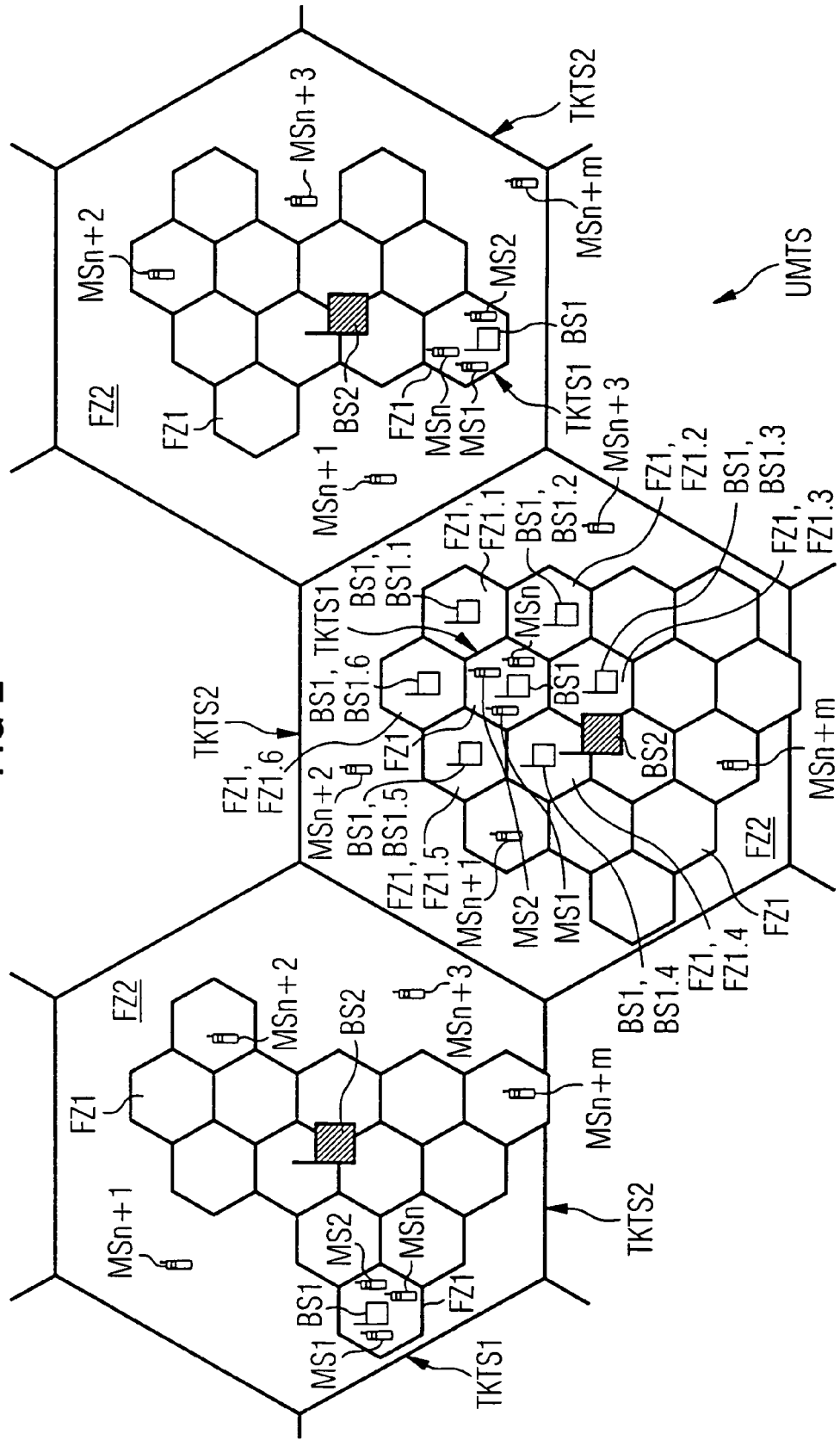
FIG. 2 shows a modified universal mobile telecommunications network.

Specifically, FIG. 2 shows a modified UMTS scenario with initial monitoring. The first base station BS1 and the first mobile stations MS1 . . . Msn, as in the UMTS scenario in FIG. 1, are located in the first radio cell FZ1.

Adjacency occurs when associated radio cells, such as the first radio cell FZ1 and the second radio cell FZ2, are adjacent to one another or overlap. As shown in FIG. 2, the second base station BSZ, which is located in the second radio cell FZ2, which completely covers the first radio cell FZ1 with the first base station BS1, and, secondly, further second base stations BS1.1 . . . BS1.6 which, although they are in the form of first base stations BS1 are referred to as further second base stations BS2 owing to their adjacency to the first base station BS1 in the first radio cell FZ1. Second base stations BS1.1 . . . BS1.6 are arranged in further second radio cells FZ1.1 . . . FZ1.6, which are immediately adjacent to the first radio cell FZ1 with the first base station BS1, and are in the form of a first radio cell FZ1 but are referred to as further second radio cells FZZ owing to the adjacency to the first radio cell FZ1 with the first base station BS1.

For the initial monitoring, the first base station BS1, which supports uncoordinated, unlicensed system operation and is associated with the first cell, FZ1, in a first monitoring mode receives messages which are relevant for handing off telecommunications connections and which are transmitted by at least one of the second base stations BSZ, BS1.1 . . . BS1.6 which are adjacent to the first base station BS1, support coordinated, licensed system operation or uncoordinated, unlicensed system operation and are each associated with the second cell FZ2, FZ1.1 . . . FZ1.6. In each case one first telecommunications channel which is in the form of the BCCH.

After this, the first base station BS1 assesses the information content and reception quality of the received messages and transmits a list, organized on the basis of the reception quality, of parameters which are required for handing over the telecommunications connection each associated with each one of the second base stations BSZ, BS1.1 . . . BS1.6, on a second telecommunications channel which is in the form of the BCCH, to the first mobile stations MS1 . . . MSn which are located in the first cell FZ1.

FIGS. 3 to 7 each show a timeslot representation with eight timeslots ZS1 . . . ZS8 to show the monitoring scenario for the base stations BS1, BSZ, BS1.1 . . . BS1.6 and the mobile stations MS1 . . . MSn, MSn+1 . . . MSn+m. The base stations BS1, BSZ, BS1.1 . . . BS1.6 use a first timeslot ZS1 as the BCCH, and that there is a bidirectional, asymmetric data link at a first frequency fi in each case between the base stations BS1, BSZ, BS1.1 . . . BS1.6 and the mobile stations MS1 . . . MSn, MSn+1. MSn+m, said data link in each case having a number of reception timeslots Rxl and transmission timeslots Txl and in each case extending over at least the timeslots ZS2 . . . ZS6. Furthermore, the expression M(f2), M(f3) in each case indicates that the base stations BS1, BS2, BS1.1 . . . BS1.6 and/or the mobile stations MS1 . . . MSn, Msn+1 . . . MSn+m carry out monitoring M on a second frequency fZ or on a third frequency f3.

Figure 3:
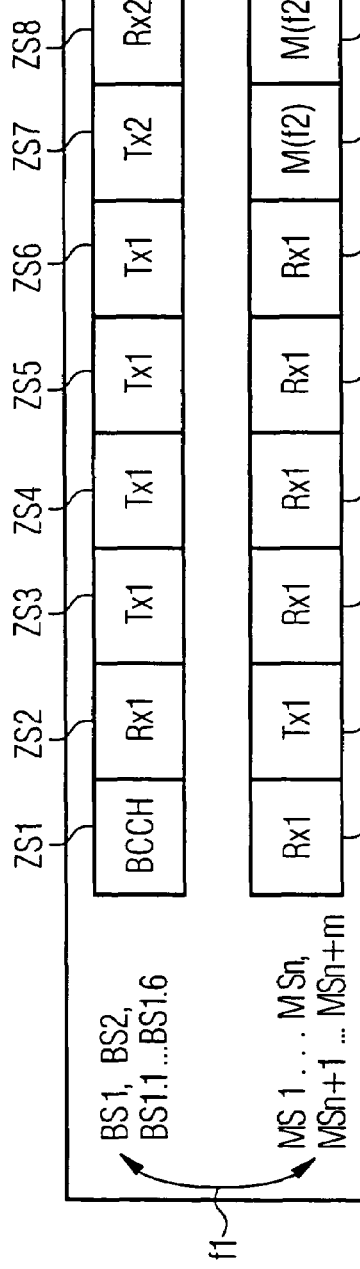
FIG. 3 shows a mobile station according to the present invention.

FIG. 3 shows that the mobile station MS1 . . . MSn, Msn+1. MSn+m maintains a bidirectional, asymmetric data link with the reception timeslots Rxl and transmission timeslots Txl in the timeslots ZS1 . . . ZS6 with the base station BS1, BSZ, BS1.1 . . . BS1.6, that the base station BS1, BSZ, BS1.1 . . . BS1.6 maintains a further bidirectional data link to another mobile station in the timeslots ZS7, ZS8, and that the mobile station MS1 . . . MSn, MSn+1 . . . MSn+m initiates a second monitoring mode, for handing off information which is relevant to telecommunications networks, by monitoring M, for example, on the second frequency fZ in the timeslots ZS7, ZS8, in order to transmit the asymmetric data link at a maximum data transmission rate, which can be predetermined, in the downlink direction and at a minimum data transmission rate, which can be predetermined, in the uplink direction via the base stations BS1.1 . . . BS1.6.

Figure 4:
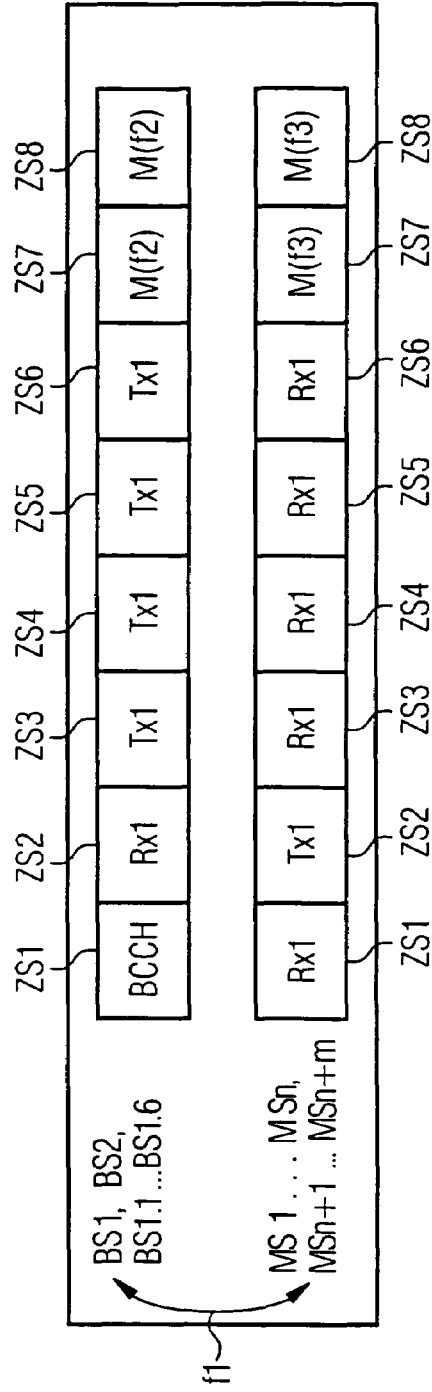
FIG. 4 shows another mobile station according to the present invention.

FIG. 4 shows that the mobile station MS1 . . . MSn, Msn+1 . . . MSn+m maintains a bidirectional, asymmetric data link with the reception timeslots Rxl and transmission timeslots Txl in the timeslots ZS1 . . . ZS6 with the base station BS1, BSZ, BS1.1 . . . BS1.6, that the mobile station MS1 . . . MSn, MSn+1 . . . MSn+m initiates the second monitoring mode for handing off information which is relevant for telecommunications connections by monitoring M. On the third frequency f3 in the timeslots ZS7, ZS8, in order to transmit the asymmetric data link at a maximum data transmission rate, which can be predetermined, in the downlink direction and at a minimum data transmission rate, which can be predetermined, in the uplink direction via the base station BS1, BSZ, BS1.1. BS1.6, and that the base station BS1, BSZ, BS1.1 . . . BS1.6 initiates the second monitoring mode for handing off information which is relevant for telecommunications connections by monitoring M. On the second frequency fZ in the timeslots ZS7, ZS8, in order to transmit the asymmetric data link at a maximum data transmission rate, which can be predetermined, in the downlink direction and at a minimum data transmission rate, which can be predetermined, in the uplink direction via the base station BS1, BS2, BS1.1 . . . BS1.6.

FIG. 5 shows that the mobile station MS1 . . . MSn, Msn+1 . . . MSn+m maintains a bidirectional asymmetric data link with the reception timeslots 3×1 and transmission timeslots Txl in the timeslots ZS1 . . . Z57 with the base station BS1, BSZ, BS1.1 . . . BS1.6, and that the base station BS1, BSZ, BS1.1 . . . BS1.6 initiates the second monitoring mode for handing off information which is relevant to telecommunications connections by monitoring M. On the second frequency fZ in the timeslot ZS8, in order to transmit the asymmetric data link at a maximum data transmission rate, which can be predetermined, in the downlink direction and at a minimum data transmission rate, which can be predetermined, in the uplink direction via the base station BS1, BSZ, BS1.1 . . . BS1.6.

FIG. 6 shows that the mobile station MS1 . . . MSn, MSn+1 . . . MSn+m maintains a bidirectional asymmetric data link with the reception timeslots Rxl and transmission timeslots Txl in the timeslots ZS1 . . . ZS7 with the base station BS1, BSZ, BS1.1 . . . BS1.6, and that the base station BS1, BSZ, BS1.1 . . . BS1.6 initiates the second monitoring mode for handing off information which is relevant to telecommunications connec-tions by monitoring M. On the second frequency f2 in the timeslot ZS8, in order to transmit the asymmetric data link at a minimum data transmission rate, which can be predetermined, in the downlink direction and at a maximum data transmission rate, which can be predetermined, in the uplink direction via the base station BS1, BSZ, BS1.1. BS1.6.

Figure 7:
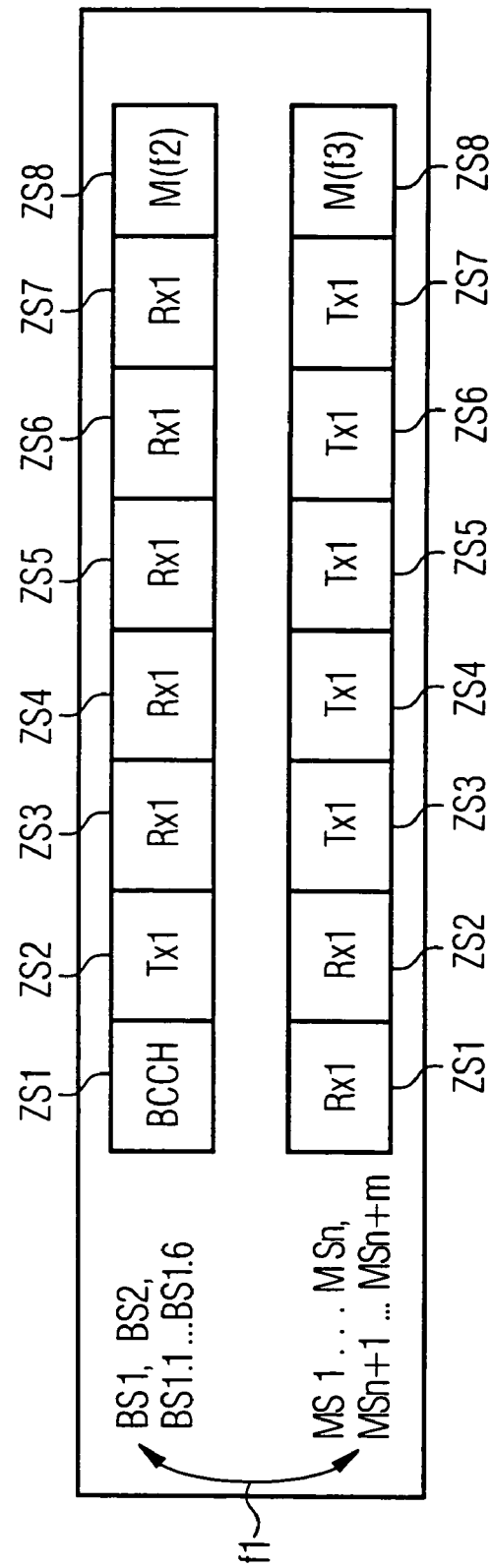
FIG. 7 shows another mobile station according to another exemplary embodiment.

FIG. 7 shows that the mobile station MS1 . . . MSn, Msn+1 . . . MSn+m maintains a bidirectional, asymmetric data link with the reception timeslots 3×1 and transmission timeslots Txl in the timeslots ZS1 . . . ZS7 with the base station BS1, BS2, BS1.1 . . . BS1.6, that the mobile station MS1 . . . MSn, MSn+1 . . . MSn+m initiates the second monitoring mode for handing off information which is relevant to telecommunications connections by monitoring M. On the third frequency f3 in the timeslot ZS8, in order to transmit the asymmetric data link at a minimum data trans-mission rate, which can be predetermined, in the downlink direction and at a maximum data transmission rate, which can be predetermined, in the uplink direction via the base station BS1, BSZ, BS1.1 . . . BS1.6, and that the base station BS1.1 . . . BS1.6 initiates the second monitoring mode for handing off information which is relevant to telecommuni-cations connection by monitoring M. On the second fre-quency f2 in the timeslot ZS8, in order to transmit the asymmetric data link at a minimum data transmission rate, which can be predetermined, in the downlink direction and at a maximum data transmission rate, which can be prede-termined, in the uplink direction via the base station BS1.1 . . . BS1.6.

Although preferred embodiments of the invention have been described herein, it is to be understood that the inven-tion is not limited to these embodiments, and that various changes and modifications thereto may be made without departing from the scope or spirit of the invention, which is defines by the following claims.

What is claimed is:

1. A method for controlling handover of telecommunica-tions connections between mobile parts and base stations in a cellular telecommunications system using wireless tele-communication, comprising:
   initiating the telecommunications connections by the mobile parts and controlling the telecommunications connections by the base stations in uncoordinated, unlicensed system operation of the telecommunications system and in coordinated, licensed system operation of the telecommunications system;
   receiving on a first telecommunications Broadcast Con-trol Channel, in a first base station which supports uncoordinated, unlicensed system operation and is associated with a first cell, messages relevant in a first monitoring mode for handing off telecommunications connections, the messages in each case being sent by at least one second base station, which is adjacent to the first base station, which supports coordinated, licensed system operation or uncoordinated, unlicensed system operation and is in each case associated with a second cell;
   assessing, in the first base station, information content and reception quality of the messages; and
   transmitting, via the first base station, a list of parameters, which is organized on the basis of the reception quality of the messages, which are required for handing over a respective telecommunications connection and which are respectively associated with any one of the at least one second base station, on a second telecommunica-tions Broadcast Control Channel to first mobile parts which are located in the first cell.

2. A method for controlling handover of telecommunica-tions connections as claimed in claim 1, wherein the first monitoring mode is switched on at predetermined periodic time intervals, beginning when the first base station is initially switched on.

3. A method for controlling handover of telecommunica-tions connections as claimed in claim 1, further comprising initiating a second monitoring mode, via at least one of a mobile part and a base station, for handing off information relevant to telecommunications connections for transmitting asymmetric data links at a maximum data transmission rate in a downlink direction and at a minimum data transmission rate in an uplink direction via the respective base station.

4. A method for controlling handover of telecommunica-tions connections as claimed in claim 1, further comprising initiating a second monitoring mode, via a base station, for handing off information relevant to telecommunications connections for transmitting asymmetric data links at a minimum data transmission rate in a downlink direction and at a maximum data transmission rate in an uplink direction via the respective base station.

5. A method for controlling handover of telecommunica-tions connections as claimed in claim 1, wherein the wireless telecommunication is carried out using at least one of CDMA, FDMA and TDMA access methods, and using at least one of TDD and FDD principles.

6. A method for controlling handover of telecommunica-tions connections between mobile parts and base stations in a cellular telecommunications system using wireless tele-communication, comprising:
   sending messages from at least one second base station, which is adjacent to a first base station, wherein said second base station supports coordinated, licensed system operation and uncoordinated, unlicensed system operation and associated with a second cell;

receiving messages in a first monitoring mode at the first base station for handing off telecommunications connections on a first telecommunications Broadcast Control Channel, wherein the first base station supports uncoordinated, unlicensed system operation and is associated with a first cell;

processing information content and reception quality data of the messages in the first base station; and transmitting, via the first base station, a list of parameters, which are organized on the basis of the reception quality of the messages, which are required for handing over a respective telecommunications connection and which are respectively associated with any one of the at least one second base station, on a second telecommunications Broadcast Control Channel to first mobile parts which are located in the first cell.

* * * * *